(12) United States Patent
Aponte Luis

(10) Patent No.: US 10,324,214 B2
(45) Date of Patent: Jun. 18, 2019

(54) ELECTROSTATIC FIELD SENSOR AND SECURITY SYSTEM IN INTERIOR AND EXTERIOR SPACES

(71) Applicant: ONTECH SECURITY, SL, La Rinconada, Seville (ES)

(72) Inventor: Juan Aponte Luis, Seville (ES)

(73) Assignee: ONTECH SECURITY, SL, La Rinconada, Sevilla (ES)

( * ) Notice: Subject to any disclaimer, the term of this patent is extended or adjusted under 35 U.S.C. 154(b) by 0 days.

(21) Appl. No.: 14/888,346

(22) PCT Filed: Sep. 23, 2014

(86) PCT No.: PCT/ES2014/070719
§ 371 (c)(1),
(2) Date: Oct. 30, 2015

(87) PCT Pub. No.: WO2015/044487
PCT Pub. Date: Apr. 2, 2015

(65) Prior Publication Data
US 2016/0195630 A1    Jul. 7, 2016

(30) Foreign Application Priority Data
Sep. 24, 2013   (ES) ...................... 1331388

(51) Int. Cl.
*G01V 3/08* (2006.01)
*G01V 3/12* (2006.01)
(Continued)

(52) U.S. Cl.
CPC ................ *G01V 3/088* (2013.01); *G01V 3/08* (2013.01); *G01V 3/12* (2013.01); *G08B 13/149* (2013.01); *G08B 21/22* (2013.01)

(58) Field of Classification Search
CPC .. G01R 15/165; G01R 29/12; G01R 29/0878; G01R 29/14; G01R 29/24; G01R 5/28;
(Continued)

(56) References Cited

U.S. PATENT DOCUMENTS 4,316,180 A * 2/1982 LeVert ................... G08B 13/26
307/116
5,914,610 A * 6/1999 Gershenfeld .......... B60N 2/002
324/658

(Continued)

OTHER PUBLICATIONS

International Search Report of PCT/ES2014/070719 dated Nov. 25, 2014.

*Primary Examiner* — Lee E Rodak
(74) *Attorney, Agent, or Firm* — Arent Fox LLP

(57) ABSTRACT

Electrostatic field sensor and security system in interior spaces and exterior spaces which can measure electrostatic fields and the variations thereof along a metal conductor that acts as a detection probe or antenna (1). The antenna (1) is connected to an electronic circuit (2, 3, 4, 31, 32) which is able to decode the changes in the electrostatic field around the conductor and to detect minuscule variations in the electrostatic field by means of a processor (7) enabling the clear detection of a human presence in an area surrounding the antenna (1) and the ability to differentiate between a human presence and any other type of animal or object.

5 Claims, 2 Drawing Sheets

(51) Int. Cl.
*G08B 21/22* (2006.01)
*G08B 13/14* (2006.01)

(58) Field of Classification Search
CPC . G01V 3/088; G01V 3/08; G01V 3/12; G08B 13/26; G08B 13/2491; G08B 13/122; G08B 15/001; G08B 21/0423; G08B 21/22; G08B 31/00; G08B 5/38; G01N 27/60
USPC ..... 324/750.17, 754.28, 658, 661, 686, 457, 324/452
See application file for complete search history.

(56) References Cited

U.S. PATENT DOCUMENTS

| | | | | |
|---|---|---|---|---|
| 6,424,259 | B1 * | 7/2002 | Gagnon | G08B 13/122 340/552 |
| 7,466,224 | B2 * | 12/2008 | Ward | G07C 9/00111 340/5.2 |
| 8,018,339 | B2 * | 9/2011 | Morita | G08B 13/10 333/237 |
| 8,274,386 | B1 * | 9/2012 | Dea | G01V 3/101 340/561 |
| 2004/0090234 | A1 | 5/2004 | Macune | |
| 2005/0122223 | A1 * | 6/2005 | Jones | G08B 13/2491 340/573.1 |
| 2006/0092022 | A1 * | 5/2006 | Cehelnik | G01V 3/088 340/561 |
| 2006/0261818 | A1 * | 11/2006 | Zank | G01V 3/088 324/457 |
| 2008/0001734 | A1 * | 1/2008 | Stilp | G05B 9/03 340/539.22 |
| 2012/0092019 | A1 * | 4/2012 | Blum | G01V 3/088 324/457 |
| 2012/0306682 | A1 * | 12/2012 | Ikuta | G08B 29/185 342/27 |
| 2015/0268027 | A1 * | 9/2015 | Gerdes | G01R 29/12 702/150 |

* cited by examiner

ELECTROSTATIC FIELD SENSOR AND SECURITY SYSTEM IN INTERIOR AND EXTERIOR SPACES

CROSS-REFERENCE TO RELATED APPLICATIONS

This application is a National Stage entry of International Application No. PCT/ES2014/070719, filed Sep. 23, 2014, which claims priority to Spanish Patent Application No. P201331388, filed Sep. 24, 2013. The disclosures of the prior applications are hereby incorporated in their entirety by reference.

OBJECT OF THE INVENTION

The object of the invention is a sensor capable of measuring electrostatic fields and a security system for homes. The invention has its practical application in the security sector, and more specifically in private or domestic security in properties, its main aim being an intrusion detection through a door, window, or fence, although it can be used in other locations such as walls or partition walls.

STATE OF THE ART

Currently, in the field of private security for indoor spaces, different types of devices capable of detecting an intrusion into a home or similar are used. Among the different types of detection devices are the following:
  (a) Volumetric sensors, which detect changes in the volume of the measuring area and translate them into motion detection.
  (b) Door-opening sensors that detect when a door or window is opened or closed.
  (c) Infrared barrier sensors that detect the passage of an object between their transmitters and receivers
  (d) Vibration or glass break sensor that detect vibration in crystals when they are beaten or suffer a break All these devices have in common that are installed inside a house. Therefore, they do not offer a preventive security, since they are only capable of detecting an intrusion when this has already happened. Therefore, it is not a preventive security system, but an event warning or alarm system. On the other hand, both volumetric sensors and infrared barrier sensors are unable to, in addition, discriminate the types of moving objects or the different movements that occur within its range.

To avoid these problems, the best solution is the electrostatic field sensors. However, most of the documents are based on uncontrolled signals and on the indirect measure of capacity depending on the variation in the resonance frequency of the signal and/or in its impedance.

For example, the document ES 2152335 T3 describes a detector device connected to an antenna for detecting small capacitive changes in an electric or electromagnetic field around the antenna, said device comprising: generating means for generating an electric or electromagnetic field around said antenna; balancing means for maintaining the generated electric or electromagnetic field around said antenna in a balanced condition; filtering means for preventing the detector device from being affected by changes in the temperature and humidity; detection means for detecting small changes in the generated electric or electromagnetic field around said antenna; and indicating means for indicating that a change in the electric or electromagnetic field has occurred; and characterized in that the generating means are a square wave generator, preferably generating a square wave between 50 Hz and 5000 Hz, and in that the unaffected square wave from said generator and the square wave capacitively affected by the field surrounding the antenna are fed to amplifier means to amplify the difference thereof.

Thanks to this detector device, it is achieved a security system in a first presence area indicating that the intruder has approached the protected object at a distance of between 100 and 150 cm; a second presence area which indicates that the intruder has approached the object protected at a distance of 30 cm; and a third presence area which indicates that the intruder almost makes contact with the protected object.

Therefore, this invention creates a square wave, wherein depending on the variation of the frequency of the same the related capacity can be calculated. This signal creates a magnetic field in the conductor which is out of control, i.e., its field lines extend in all directions and, in addition, undergoes variations with the temperature, humidity and other conditions, so it needs to correct these problems.

DESCRIPTION OF THE INVENTION

The object of this invention is a sensor capable of measuring disturbances occurring in the electrostatic field around a probe that acts as an electrode or antenna, due to the human presence in its vicinity. This electrostatic field is also redirected in a controlled manner to focus their influence on a certain area. In addition, the sensor is able to differentiate on the basis of the magnitude of the change, persons from other living beings or material objects.

In turn, this sensor is an integral part of a security system designed for preventive detection of an intrusion into a delimited space, through the integration of sensors, wireless communication devices and central alarm management.

More specifically, in a first aspect of the invention, the electrostatic field sensor is characterized in that it comprises two electrostatic field-measuring circuits, signals of which are decoupled with respect to each other by a decoupling circuit; and wherein said electrostatic field-measuring circuits are connected with an antenna consisting of a coaxial cable through a phase-measuring circuit.

In a second practical embodiment of the invention, the electrostatic and magnetic field sensor that is characterized by the use of a tuner circuit with operating frequency less than 5 MHz. The parts in which the electronic circuit is divided would be: RLC tank circuit and phase-stabilizing circuit. It has a coaxial cable connected to said circuit to act as an antenna and generate the propagation of the electrostatic field. Said antenna can be of several layers of electrode in order to control the zone of influence of fields generated.

In a second aspect of the invention, the security system for interior and exterior spaces comprises at least one electrostatic field sensor as described above connected to a signal conditioner circuit and a processor comprising a memory that incorporates at least a software with instructions configured to detect the variations in the electrostatic field received from the sensor; determine the volume and density of the object that has generated the variation in the electrostatic field; and establish whether the volume and density of the object corresponds to an unauthorized intrusion and emit an encrypted signal to a switchboard.

Finally, in a third aspect of the invention is claimed the method for detection of intruders in homes comprising the steps of: (a) detect the variation in a electrostatic field with at least an electrostatic field sensor as described above; (b) determine the volume and density of the object that has generated a variation in the electrostatic field; (c) establish whether said volume and density of the object corresponds to an unauthorized intrusion; and (d) emit an alarm encrypted signal.

The invention is based on the capacity of sensor object of the invention to measure the variations in the electrostatic field existing around a conductor, in the case of the invention a coaxial cable, which acts as a probe or antenna, when said field is affected by the influence of a charged body, such as the human body.

The human body, like any other existing object, has its own electrical characteristics, dependent on the materials, density, volume, temperature and conductivity. The differences in the potential between the different objects result in electrostatic interactions from an object to another when they come into contact or are close to each other. This effect is used by the sensor object of the invention, achieving the continuous measurement of fluctuations that said field causes in an electronic circuit connected to it. This circuit, through the changes in the field magnitude is able to distinguish different types of bodies or objects and to discriminate the human presence from another material or animal presence.

Indeed, the sensor object of the invention, in carrying out the continuous measurement of the capacity, it molds the electrical field generated on the antenna and through infinite field lines, a processor connected to the same allows determining the volume and density of material which generates the field fluctuation on the antenna.

The invention is applied to security systems in homes, giving the capacity to detect intrusions proactively in doors, windows and fences, i.e. the detection capability before the intrusion takes place.

Throughout the description and claims, the word "comprises" and its variations are not intended to exclude other technical features, additives, components or steps. For those skilled in the art, other objects, advantages and characteristics of the invention will emerge in part from the description and in part from the practice of the invention. The following examples and drawings are provided by way of illustration, and are not intended to be limiting of the present invention. Furthermore, the present invention covers all the possible combinations of particular and preferred embodiments herein indicated.

BRIEF DESCRIPTION OF THE FIGURES

There follows a very brief description of a series of drawings that help to provide a better understanding of the invention and which are associated expressly with an embodiment of said invention that is presented as a non-limiting example thereof.

EXPLANATION OF A DETAILED EMBODIMENT OF THE INVENTION

Figure 1:
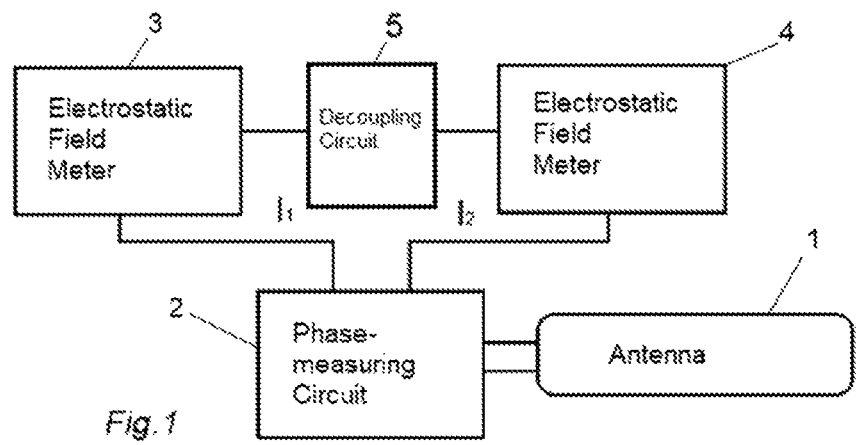
FIG. 1 shows a scheme of the electrostatic field sensor object of the invention.

As can be seen in FIG. 1, the electrostatic field sensor comprises an antenna 1 consisting of a coaxial cable, either with one, two or three wires. The antenna 1 is directly connected with a phase-measuring circuit 2, which is a circuit that measures and analyzes the signals of two electrostatic field meters (3, 4) connected with the phase-measuring circuit 2. The electrostatic field meters (3, 4) are decoupled from each other by a decoupling circuit 5, so that the potential difference between both meters (3, 4) is zero, although the respective currents $I_1$ and $I_2$ are different.

Figure 3:
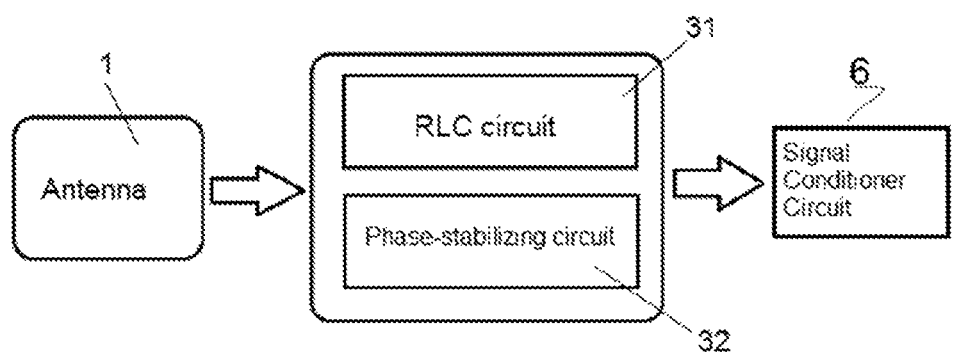
FIG. 3 shows a second embodiment of the electrostatic field sensor object of the invention.

However, as shown in FIG. 3, the electrostatic field sensor object of the invention comprises a second practical embodiment, wherein the antenna 1 is connected to a tuner circuit with operating frequency less than 5 MHz comprising a RLC circuit 31 and a phase-stabilizing circuit 32.

Like in the first embodiment, the antenna 1 is a coaxial cable connected to said tuner circuit (31, 32) and also configured to generate the spread of the electric and magnetic field. This antenna may have a multi-layered electrode in order to control the zone of influence of fields generated.

Since the antenna 1 is closed to the coaxial active, the magnetic field generated in the conductor is confined and therefore it is possible to create the field where desired, such as in a door, window or wall.

Figure 2:
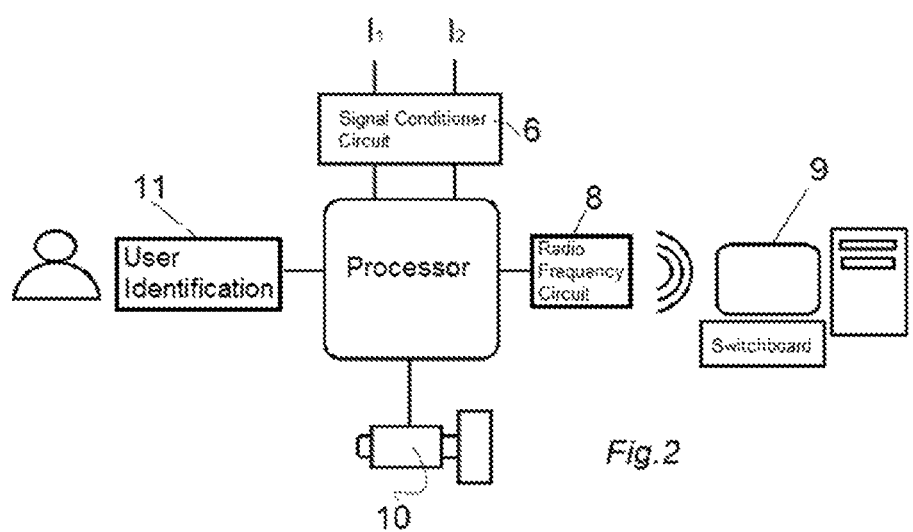
FIG. 2 shows a scheme of the security system object of the invention.

FIG. 2 shows a schematic view of the security system object of the invention, comprising an electrostatic field sensor as described in the FIG. 1 or FIG. 3, connected with a signal conditioner circuit 6, essentially an analog-digital converter, which in turn is connected to a processor 7 configured to detect the variations in the electrostatic field, establishing a kind of three-dimensional map with such variations, being able to determine the volume and density of the object that said variation has generated.

This processor 7, in turn, is connected to a radio frequency circuit 8 which emits a signal encrypted towards a switchboard 9 which controls the entire installation.

In addition, the processor 7 is connected to a security camera 10 that records the object detected and defined by the processor 7 as an unauthorized intrusion.

Finally, the processor 7 is connected with means of user identification 11, preferably via Bluetooth®, in order to allow authorized system users to have access to the site and do not generate an alarm signal.

The invention claimed is:

1. An electrostatic field sensor comprising:
   one antenna;
   a phase-measuring circuit directly connected with the one antenna; and
   two electrostatic field meters connected with the one antenna through the phase-measuring circuit;
   wherein the phase-measuring circuit is arranged to measure and analyze the signals of the two electrostatic field meters; and wherein the signals of the two electrostatic field meters are decoupled with respect to each other by a decoupling circuit that is connected between the two electrostatic field meters such that the potential difference between the two electrostatic field meters is zero;
   and wherein the sensor is arranged to:
   generate an electrostatic field around the antenna; and
   measure continuously the variations in the electrostatic field generated around the antenna; and
   molding the electrostatic field generated around the one antenna by carrying out the continuous measurement of the variations in the electrostatic field generated around the one antenna.

2. A security system in interior spaces comprising, at least:
   the electrostatic field sensor of claim 1 connected to a signal conditioner circuit;
   means for identifying authorized users; and
   a processor comprising a memory in which is stored a software with instructions arranged to:

detect a variation in an electrostatic field received from the sensor by the continuous measurement of fluctuations in the electrostatic field generated around the one antenna;

discriminate a human presence from another material or animal presence through the detected variations in the electrostatic field generated around the one antenna;

establish if the human presence is unauthorized; and emit an encrypted signal to a switchboard via a radio frequency emitter.

3. The system of claim 2 comprising a camera connected with the processor wherein the instructions stored in the memory are further arranged to cause the camera to perform imaging, if the human presence is unauthorized.

4. A method for intrusion detection in interior spaces comprising the steps of:

detect a variation in an electrostatic field by the continuous measurement of fluctuations in the electrostatic field generated around the one antenna with the sensor of claim 1;

discriminate a human presence from another material or animal presence through the detected variations in the electrostatic field generated around the one antenna;

establish if the human presence is unauthorized; and emit an encrypted signal to a switchboard via a radio frequency emitter.

5. The method of claim 4 further comprising a step of recording an image of an unauthorized human presence.

\* \* \* \* \*